US007279594B2

(12) United States Patent  
Donea et al.

(10) Patent No.: US 7,279,594 B2
(45) Date of Patent: Oct. 9, 2007

(54) THERMOPLASTIC COMPOSITION, ARTICLES THEREOF, AND METHOD OF MAKING THE ARTICLES

(75) Inventors: Constantin Donea, Evansville, IN (US); Rajendra Kashinath Singh, Evansville, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/010,852

(22) Filed: Dec. 13, 2004

(65) Prior Publication Data

US 2006/0125143 A1    Jun. 15, 2006

(51) Int. Cl.
C08G 63/00 (2006.01)
(52) U.S. Cl. ............... 562/400; 502/104; 502/150; 502/154; 502/156; 528/176
(58) Field of Classification Search ........... 264/176.1, 264/219; 525/420, 421, 423
See application file for complete search history.

(56) References Cited

U.S. PATENT DOCUMENTS

| | | | |
|---|---|---|---|
| 2,991,273 A | 7/1961 | Hechelhammer et al. | |
| 2,998,355 A | 9/1961 | Goldberg | |
| 3,028,365 A | 4/1962 | Schnell et al. | |
| 3,148,172 A | 9/1964 | Fox | |
| 3,271,367 A | 9/1966 | Schnell et al. | |
| 3,271,368 A | 9/1966 | Goldberg et al. | |
| 3,539,657 A | 11/1970 | Noshay et al. | |
| 3,803,085 A | 4/1974 | Takekoshi et al. | |
| 3,814,869 A | 6/1974 | De Luca | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,905,942 A | 9/1975 | Takekoshi et al. | |
| 3,983,093 A | 9/1976 | Williams, III et al. | |
| 4,433,104 A | 2/1984 | Giles, Jr. | |
| 4,443,591 A | 4/1984 | Schmidt et al. | |
| 4,532,054 A | 7/1985 | Johnson | |
| 4,548,997 A | 10/1985 | Mellinger et al. | |
| 4,629,759 A | 12/1986 | Rock | |
| 4,665,195 A | 5/1987 | Stogryn et al. | |
| 4,737,414 A | 4/1988 | Hirt, Jr. et al. | |
| 4,772,653 A | 9/1988 | McKenna | |
| 4,816,527 A | 3/1989 | Rock | |
| 4,877,682 A | 10/1989 | Sauers et al. | |
| 4,923,933 A * | 5/1990 | Curry | 525/439 |
| 5,051,483 A | 9/1991 | Rock et al. | |
| 5,387,639 A | 2/1995 | Sybert et al. | |
| 5,852,085 A | 12/1998 | Brown et al. | |
| 5,916,958 A | 6/1999 | Kelly et al. | |
| 5,986,016 A * | 11/1999 | Puyenbroek et al. | 525/420 |
| 6,011,122 A | 1/2000 | Puyenbroek | |
| 6,072,010 A | 6/2000 | Puyenbroek | |
| 6,221,940 B1 | 4/2001 | Puyenbroek et al. | |
| 6,310,145 B1 | 10/2001 | Puyenbroek et al. | |
| 2002/0182352 A1 | 12/2002 | Mitten et al. | |
| 2004/0232598 A1 | 11/2004 | Donea et al. | |
| 2005/0038145 A1 | 2/2005 | Gallucci et al. | |

FOREIGN PATENT DOCUMENTS

| | | |
|---|---|---|
| EP | 0158733 | 10/1985 |
| EP | 0519657 | 12/1992 |
| EP | 0 594 386 | 10/1993 |
| EP | 0 926 202 | 12/1998 |
| EP | 0 926 204 | 12/1998 |
| WO | WO84/04752 | 12/1984 |
| WO | WO94/10245 | 5/1994 |

OTHER PUBLICATIONS

ASTM G155-00a "Standard Practice for Operating Xenon Arc Light Apparatus for Exposure of Non-Metallic Materials" pp. 1-8.
ASTM D648-01 "Standard Test Method for Deflection Temperature of Plastic Under Flexural Load in the Edgewise Position" pp. 1-12.
Wypych, George. Handbookl of Fillers, 2nd Edition. Toronto, ChemTec Publishing, 2000, pp. 150-153 and 246-248,TP1114. W96.
Hawley's Condensed Chemical Dictionary, 14th Edition, 2002.
International Search Report dated Sep. 17, 2004.
International Search Report for International Application No. PCT/US2005/043733, mailed Mar. 21, 2006.
ASTM D2244-02 "Standard Practice for Calculation of Color Tolerances and Color Differences from Instrumentally Measured Color Corrdinates" pp. 1-10.
ASTM D256-04 "Standard Test Methods for Determining the Izod Pendulum Impact Resistance of Plastics" pp. 1-20.
ASTM D523-89 (Reapproved 1999) "Standard Test Method for Specular Gloss" pp. 1-5.
FAR Sec. 25.853 http://www.airweb.faa.gov/Regulatory_and_Guidance_Library/rgFAR.nsf/0/5851C41586ACB17B8525667 20051A840?OpenDocument. Printed on Sep. 28, 2004 (2 pages).
FAR Sec. F25.1 http://www.airweb.faa.gov/Regulatory_and_Guidance_Library/rgFAR.nsf/0/4652EEDBE73479DB86256D 780054DA27?OpenDocument.:Printed on Sep. 28, 2004 (4 pages).
FAR Sec. F25.2 http://www.airweb.faa.gov/Regulatory_and_Guidance_Library/rgFAR.nsf/0/7F4AA267A05DF37286256A5 C006829A5?OpenDocument. Printed on Sep. 28, 2004 (8 pages).
FAR Sec. F25.3 http://www.airweb.faa.gov/Regulatory_and_Guidance_Library/rgFAR.nsf/0/DD926E299956E75E86256A5 C00683A27?OpenDocument. Printed on Sep. 28, 2004 (7 pages).
FAR Sec. F25.4 http://www.airweb.faa.gov/Regulatory_and_Guidance_Library/rgFAR.nsf/0/E801BD1CE9D6C9358525667 3004F6097?OpenDocument. Printed on Sep. 28, 2004 (11 pages).
FAR Sec. F25.5 http://www.airweb.faa.gov/Regulatory_and_Guidance_Library/rgFAR.nsf/0/2A254C0127EFE73A8525667 3004F6278?OpenDocument. Printed on Sep. 28, 2004 (1 page).

(Continued)

*Primary Examiner*—Terressa Boykin
(74) *Attorney, Agent, or Firm*—Cantor Colburn LLP

(57) ABSTRACT

A thermoplastic composition comprises greater than or equal to about 60 wt. % polycarbonate; and about 10 wt. % to about 40 wt. % of a polyimide; wherein weight percents are based on a total weight of the thermoplastic composition.

29 Claims, No Drawings

OTHER PUBLICATIONS

FAR Sec F25.6 http://www.airweb.faa.gov/Regulatory_and_Guidance_Library/rgFAR.nsf/0/C1EFB9D98600FB0386256D780054DB5D?OpenDocument. Printed on Sep. 30, 2004 (11 pages).
FAR SecF25.7 http://www.airweb.faa.gov/Regulatory_and_Guidance_Library/rgFAR.nsf/0/571DA769C51356D286256D780054DCBC?OpenDocument. Printed on Sep. 28, 2004 (15 pages).

ASTM E162-02a "Standard Test Method for Surface Flammability of Materials Using a Radiant Heat Energy Source". pp. 1-10.
ASTM E662-03 "Standard Test Method for Specific Optical Density of Smoke Generated by Solid Materials". pp. 1-24.
FAR Section 223.5 "Safety Glazing Standards-Locomotives, Passenger Cars and Cabooses". pp. 261-266.

* cited by examiner

THERMOPLASTIC COMPOSITION, ARTICLES THEREOF, AND METHOD OF MAKING THE ARTICLES

BACKGROUND

Because of their lightweight, durability and strength, engineering thermoplastics can be used for the construction of many components of vehicular interiors, including train cars and aircraft. Components such as wall panels, overhead storage lockers, serving trays, seat backs, cabin partitions, and the like, can be conveniently and economically fabricated by, for example, extrusion, thermoforming, injection molding, and blow-molding techniques.

Interior components of train cars and aircraft are regularly subjected to impacts of varying intensities from equipment and luggage. It is very desirable that engineering thermoplastics used for fabricating such parts exhibit impact strength. It is also desirable for the interior components to be manufactured with the desired aesthetic appearance, such as gloss, texture, color effects, and the like. Additionally, interior components must meet the government and transportation industry safety standards for flammability, smoke, and toxicity.

Accordingly, there is a need in the art for a flame resistant thermoplastic composition having impact strength and good aesthetics.

SUMMARY

Disclosed herein are thermoplastic compositions, articles thereof, and methods of making the articles.

One embodiment of a thermoplastic composition comprises greater than or equal to about 60 wt. % polycarbonate; and about 10 wt. % to about 40 wt. % of a polyimide; wherein weight percents are based on a total weight of the thermoplastic composition.

Another embodiment of a thermoplastic composition comprises reaction products of greater than or equal to about 60 wt. % polycarbonate; about 10 wt. % to about 40 wt. % of a polyimide, and wherein weight percents are based on a total weight of the thermoplastic composition.

A third embodiment of a thermoplastic composition consists essentially of greater than or equal to about 60 wt. % polycarbonate; about 10 wt. % to about 40 wt. % of a polyimide; and wherein weight percents are based on a total weight of the thermoplastic composition.

A fourth embodiment of a thermoplastic composition consists essentially of reaction products of greater than or equal to about 60 wt. % polycarbonate; about 10 wt. % to about 40 wt. % of a polyimide; and wherein weight percents are based on a total weight of the thermoplastic composition.

One embodiment of an article comprises a thermoplastic composition comprising greater than or equal to about 60 wt. % polycarbonate; and about 10 wt. % to about 40 wt. % of a polyimide, wherein weight percents are based on a total weight of the thermoplastic composition.

One embodiment of a method of making an article comprises forming a film comprising greater than or equal to about 60 wt. % polycarbonate; and about 10 wt. % to about 40 wt. % of a polyimide, wherein weight percents are based on a total weight of the thermoplastic composition; and thermoforming the film to form the article.

Another embodiment of a method of making an article comprises co-extruding a core layer and cap layer to form a multi-layer film, wherein the core layer comprises greater than or equal to about 60 wt. % polycarbonate; and about 10 wt. % to about 40 wt. % of a polyimide, wherein weight percents are based on a total weight of the core layer; and thermoforming the multi-layer film to form the article.

The above-described and other features will be appreciated and understood by those skilled in the art from the following detailed description, drawings, and appended claims.

DETAILED DESCRIPTION

Disclosed herein is a thermoplastic composition that can be employed in single or multi-layer films (which can also be referred to as a sheet, layer, foil, and the like), which can be employed in forming components of vehicular interiors (e.g., train car interiors, aircraft interiors, and the like). While reference is made to components for train car interiors and aircraft interiors throughout this disclosure, it is to be understood by those skilled in the art that the thermoplastic composition disclosed herein can be employed in other applications (e.g., buses, ships, residential and commercial buildings, and the like), as well as in a variety of other articles.

It should first be noted that the terms "first," "second," and the like herein do not denote any order, quantity, or importance, but rather are used to distinguish one element from another, and the terms "a" and "an" herein do not denote a limitation of quantity, but rather denote the presence of at least one of the referenced item. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," is inclusive of the endpoints and all intermediate values of the ranges, e.g., "about 5 wt. % to about 25 wt. %, about 5 wt. % to about 15 wt. %," etc.). The modifier "about" used in connection with a quantity is inclusive of the stated value and has the meaning dictated by the context (e.g., includes the degree of error associated with measurement of the particular quantity).

Furthermore, it is noted that compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As will be explained in much greater detail throughout this disclosure, a thermoplastic composition has unexpectedly been discovered that can meet the transportation industry safety standards for flammability, smoke, and toxicity, while exhibiting impact strength and aesthetic appearance (e.g., low gloss). More particularly, the thermoplastic composition can comprise a sufficient amount of a polyimide resin (e.g., a polyetherimide resin) to impart the desirable flammability, smoke, and toxicity properties to the thermoplastic composition and a substantial amount of polycarbonate (e.g., greater than or equal to 60 wt. %, particularly 60 wt. % to about 90 wt. %, and more particularly about 70 wt. % to about 80 wt. %, wherein weight percents are based on a total weight of the thermoplastic composition). The thermoplastic composition can further comprise other resins, additives, and the like, to impart the desired properties to the thermoplastic composition.

Suitable polyimide resins include, but are not limited to, those having the general formula (I):

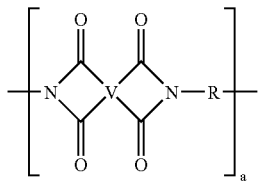

(I)

wherein a is more than 1, particularly about 10 to about 1000 or more, and more specifically about 10 to about 500; and wherein V is a tetravalent linker without limitation, as long as the linker does not impede synthesis or use of the polyimide. Suitable linkers include, but are not limited to: (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations comprising at least one of the foregoing. Suitable substitutions and/or linkers include, but are not limited to, ethers, epoxides, amides, esters, and combinations comprising at least one of the foregoing. More particularly, linkers can include, but are not limited to, tetravalent aromatic radicals of formula (II), such as

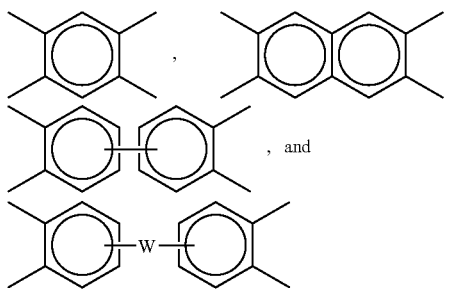

(II)

wherein W is a divalent moiety, which can include —O—, —S—, —C(O)—, —SO$_2$—, —SO—, —C$_y$H$_{2y}$— (y being an integer from 1 to 5), and halogenated derivatives thereof, including perfluoroalkylene groups, or a group of the formula —O—Z—O— wherein the divalent bonds of the —O— or the —O—Z—O— group are in the 3,3',3,4',4,3', or the 4,4' positions.

In some embodiments, the moiety "Z" can be a divalent aromatic group derived from a dihydroxy substituted aromatic hydrocarbon, and can have the general formula (III):

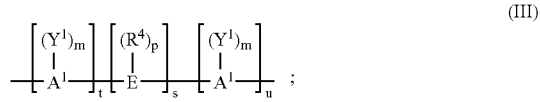

(III)

where "A$^1$" represents an aromatic group including, but not limited to, phenylene, biphenylene, naphthylene, and the like. In some embodiments, "E" can be an alkylene or alkylidene group including, but not limited to, methylene, ethylene, ethylidene, propylene, propylidene, isopropylidene, butylene, butylidene, isobutylidene, amylene, amylidene, isoamylidene, and the like. In other embodiments, when "E" is an alkylene or alkylidene group, it can also comprise two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage; or a sulfur-containing linkage including, but not limited to, sulfide, sulfoxide, sulfone, and the like; or a phosphorus-containing linkage including, but not limited to, phosphinyl, phosphonyl, and the like. In other embodiments, "E" can be a cycloaliphatic group, non-limiting examples of which include, but are not limited to, cyclopentylidene, cyclohexylidene, 3,3,5-trimethylcyclohexylidene, methylcyclohexylidene, bicyclo[2,2,1]hept-2-ylidene, 1,7,7-trimethylbicyclo[2,2,1]hept-2-ylidene, isopropylidene, neopentylidene, cyclopentadecylidene, cyclododecylidene, and adamantylidene; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. R$^4$ independently at each occurrence represents a monovalent hydrocarbon group including, but not limited to, alkenyl, allyl, alkyl, aryl, aralkyl, alkaryl, or cycloalkyl. In various embodiments, a monovalent hydrocarbon group of R$^4$ can be halogen-substituted, particularly fluoro- or chloro-substituted, for example as in dihaloalkylidene group of formula C=C(Z$^1$)$_2$, wherein each Z$^1$ is hydrogen, chlorine, or bromine, subject to the provision that at least one Z$^1$ is chlorine or bromine; and combinations comprising at least one of the foregoing moieties. In a particular embodiment, the dihaloalkylidene group can be a dichloroalkylidene, particularly gem-dichloroalkylidene group. Y$^1$ independently at each occurrence can be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, OR$^5$ wherein R$^5$ is a monovalent hydrocarbon group including, but not limited to, alkyl, aryl, aralkyl, alkaryl, or cycloalkyl; it being only necessary that Y$^1$ be inert to and unaffected by the reactants and reaction conditions used to prepare the polymer. In some particular embodiments, Y$^1$ can comprise a halo group or C$_1$-C$_6$ alkyl group. The letter "m" represents any integer from and including zero through the number of positions on A$^1$ available for substitution; "p" represents an integer from and including zero through the number of positions on E available for substitution; "t" represents an integer equal to at least one; "s" represents an integer equal to either zero or one; and "u" represents any integer including zero.

When more than one Y$^1$ substituent is present in formula (III), they can be the same or different. The same holds true for the R$^1$ substituent. Where "s" is zero in formula (III) and "u" is not zero, the aromatic rings are directly joined by a covalent bond with no intervening alkylidene or other bridge. The positions of the oxygen groups and Y$^1$ on the aromatic nuclear residues A$^1$ can be varied in the ortho, meta, or para positions and the groupings can be in vicinal, asymmetrical or symmetrical relationship, where two or more ring carbon atoms of the hydrocarbon residue are substituted with Y$^1$ and oxygen groups. In some particular embodiments, the parameters "t", "s", and "u" each have the value of one; both $A^1$ radicals are unsubstituted phenylene radicals; and E is an alkylidene group such as isopropylidene. In some particular embodiments, both $A^1$ radicals are p-phenylene, although both can be o- or m-phenylene or one o- or m-phenylene and the other p-phenylene.

In some embodiments of the moiety "Z", the moiety "E" can comprise an unsaturated alkylidene group. Suitable dihydroxy-substituted aromatic hydrocarbons from which "Z" can be derived in this case include those of the formula (IV):

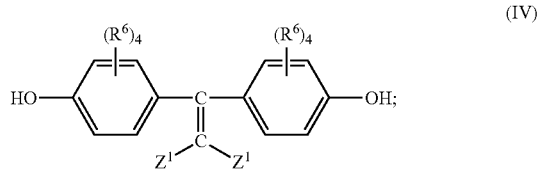

where each $R^6$ is independently hydrogen, chlorine, bromine, or a $C_{1-30}$ monovalent hydrocarbon or hydrocarbonoxy group, each $Z^1$ is hydrogen, chlorine or bromine, subject to the provision that at least one $Z^1$ is chlorine or bromine.

Examples of the moiety "Z" also include those derived from the dihydroxy-substituted aromatic hydrocarbons of the formula (V):

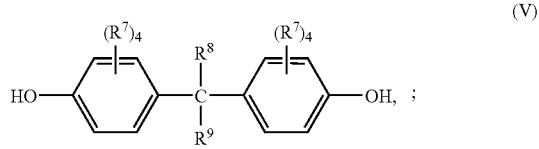

where each $R^7$ is independently hydrogen, chlorine, bromine, or a $C_{1-30}$ monovalent hydrocarbon or hydrocarbonoxy group, and $R^8$ and $R^9$ are independently hydrogen or a $C_{1-30}$ hydrocarbon group.

In various embodiments, the moiety "Z" can be derived from dihydroxy-substituted aromatic hydrocarbons disclosed by name or formula (generic or specific) in U.S. Pat. Nos. 2,991,273, 2,999,835, 3,028,365, 3,148,172, 3,271,367, and 3,271,368. In some embodiments, such dihydroxy-substituted aromatic hydrocarbons include bis(4-hydroxyphenyl)sulfide, 1,4-dihydroxybenzene, 4,4'-oxydiphenol, 2,2-bis(4-hydroxyphenyl)hexafluoropropane, and combinations comprising at least one of the foregoing dihydroxy-substituted aromatic hydrocarbons. In other embodiments, such dihydroxy-substituted aromatic hydrocarbons include 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl) methane; bis(4-hydroxy-2,6-dimethyl-3-methoxyphenyl) methane; 1,1-bis(4-hydroxyphenyl)ethane; 1,2-bis(4-hydroxyphenyl)ethane; 1,1-bis(4-hydroxy-2-chlorophenyl) ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl) propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); 2-(3-methyl-4-hydroxyphenyl-2-(4-hydroxyphenyl) propane; 2-(3,5-dimethyl-4-hydroxyphenyl)-2-(4hydroxyphenyl)propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; and bis-(3,5-dimethylphenyl-4-hydroxyphenyl)sulfide. In some embodiments, aromatic dianhydride monomers further comprise functionality selected from the group consisting of ethers, alkoxys, aryloxys, sulfones, perfluoro alkyl groups and combinations comprising at least one of the foregoing. In a one embodiment, such a dihydroxy-substituted aromatic hydrocarbon can comprise bisphenol-A.

In some embodiments, "Z" can be derived from dihydroxy-substituted aromatic hydrocarbons wherein "E" is an alkylene or alkylidene group and part of one or more fused rings attached to one or more aromatic groups bearing one oxygen substituent. Suitable dihydroxy-substituted aromatic hydrocarbons of this type include those containing indane structural units such as 3-(4-hydroxyphenyl)-1,1,3-trimethylindan-5-ol and 1-(4-hydroxyphenyl)-1,3,3-trimethylindan-5-ol. Also included among suitable dihydroxy-substituted aromatic hydrocarbons of the type comprising one or more alkylene or alkylidene groups as part of fused rings are the 2,2,2',2'-tetrahydro-1,1'-spirobi[1H-indene]diols, illustrative examples of which include 2,2,2',2'-tetrahydro-3,3, 3',3'-tetramethyl-1,1'-spirobi[1H-indene]-6,6'-diol (sometimes known as "SBI"). The structures —O—Z—O— derived from dihydroxy-substituted aromatic hydrocarbons can comprise mixtures of structural units derived from mixtures comprising any of the foregoing dihydroxy-substituted aromatic hydrocarbons.

In some particular embodiments, Z includes, but is not limited, to divalent radicals of formula (VI):

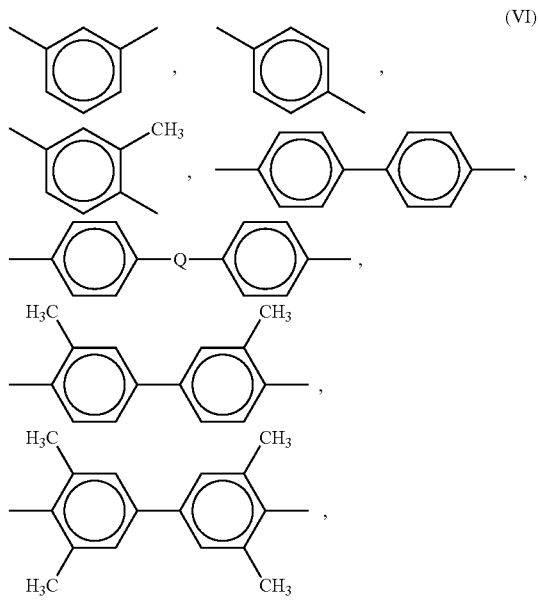

-continued

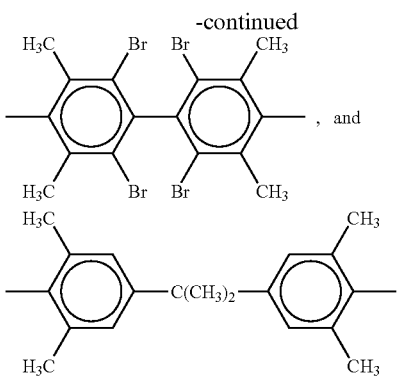

wherein Q is as defined below.

R in formula (I) includes, but is not limited, to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (VII)

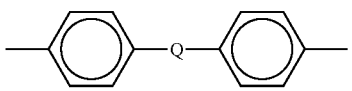

(VII)

wherein Q includes, but is not limited to, a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

Classes of polyimides can include polyamidimides and polyetherimides, particularly those polyetherimides that are melt processable, such as those whose preparation and properties are described in U.S. Pat. Nos. 3,803,085 and 3,905,942.

Polyetherimide resins can comprise more than 1, specifically about 10 to about 1,000 or more, and more specifically about 10 to about 500 structural units, of the formula (VIII):

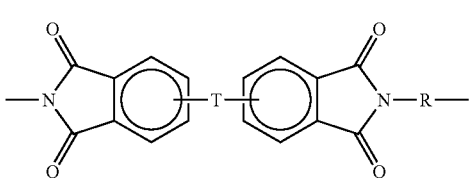

(VIII)

wherein T is —O— or a group of the formula —O—Z—O— wherein the divalent bonds of the —O— or the —O—Z—O— group are in the 3,3', 3,4', 4,3', or the 4,4' positions, and wherein Z is defined above.

In an embodiment, the polyetherimide can be a copolymer which, in addition to the etherimide units described above, can further comprise polyimide structural units of the formula (IX):

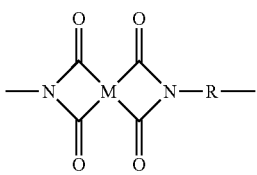

(IX)

wherein R is as previously defined for formula (1) and M includes, but is not limited to, radicals of formula (X):

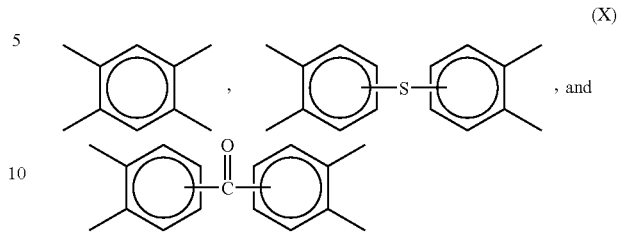

(X)

In an embodiment, the polyetherimide resin can comprise structural units according to formula (VIII) wherein each R is independently p-phenylene or m-phenylene or a combination comprising at least one of the foregoing and T is a divalent radical of the formula (XI):

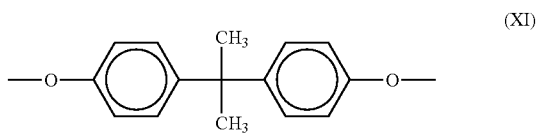

(XI)

Included among the many methods of making the polyimides, particularly polyetherimides, are those disclosed in U.S. Pat. Nos. 3,847,867, 3,814,869, 3,850,885, 3,852,242, 3,855,178, 3,983,093, and 4,443,591. These patents are mentioned for the purpose of teaching, by way of illustration, general and specific methods for preparing polyimides.

As used herein, the terms "polycarbonate", can include resins having structural units of the formula (XII):

(XII)

in which at least about 60 percent of the total number of R$^1$ groups are aromatic organic radicals and the balance thereof are aliphatic, alicyclic, or aromatic radicals. Particularly, R$^1$ can be an aromatic organic radical and, more particularly, a radical of the formula (X):

—A$^1$—Y$^1$—A$^2$ (XIII)

wherein each of A$^1$ and A$^2$ is a monocyclic divalent aryl radical and Y$^1$ is a bridging radical having one or two atoms that separate A$^1$ from A$^2$. In an embodiment, one atom separates A$^1$ from A$^2$. Illustrative non-limiting examples of radicals of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical Y$^1$ can be a hydrocarbon group or a saturated hydrocarbon group such as methylene, cyclohexylidene or isopropylidene.

Polycarbonates can be produced by the reaction of a dihydroxy compound with a carbonate precursor, such as phosgene, a haloformate, a carbonate, a carbonate ester, and the like, and generally in the presence of an acid acceptor and a molecular weight regulator. The carbonate or carbonate ester can be substituted or unsubstituted. As used herein, the term "dihydroxy compounds" can comprise the formula HO—R$^1$—OH, which includes dihydroxy compounds of formula (XIV):

HO—A$^1$—Y$^1$—A$^2$—OH (XIV)

wherein $Y^1$, $A^1$ and $A^2$ are as described above. Also included are bisphenol compounds of general formula (XV):

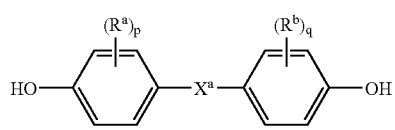

(XV)

wherein $R^a$ and $R^b$ each represent a halogen atom or a monovalent hydrocarbon group and can be the same or different; p and q are each independently integers of 0 to 4; and $X^a$ represents one of the groups of formula (XVI):

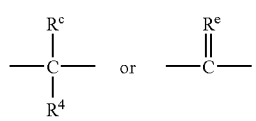

(XVI)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylnethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that can include 1,1-bis(4-hydroxyphenyl) methane, 1,1-bis (4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane. Combinations comprising at least one of the foregoing bisphenol compounds can also be used.

Branched polycarbonates are also useful, as well as blends of a linear polycarbonate and a branched polycarbonate. The branched polycarbonates can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of about 0.05 wt. % to about 2.0 wt. %, wherein weight percents are based on a total weight of the thermoplastic composition. All types of polycarbonate end groups are contemplated as being useful in the polycarbonate composition, provided that such end groups do not significantly affect desired properties of the thermoplastic compositions.

"Polycarbonates" and "polycarbonate resins" as used herein further includes blends of polycarbonates with other copolymers comprising carbonate chain units. A specific suitable copolymer is a polyester carbonate, also known as a copolyester-polycarbonate. Such copolymers further contain, in addition to recurring carbonate chain units of the formula (1), repeating units of formula (XVII):

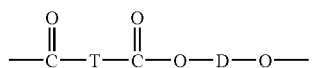

(XVII)

wherein D is a divalent radical derived from a dihydroxy compound, and can be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T divalent radical derived from a dicarboxylic acid, and can be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (XVIII):

(XVIII)

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that can be represented by the formula (XVII) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that can be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations comprising at least one of the foregoing. A specific dicarboxylic acid can comprise a mixture of isophthalic acid and terephthalic acid wherein the weight ratio of terephthalic acid to isophthalic acid is about 10:1 to about 0.2:9.8. In another specific embodiment, D is a $C_{2-6}$ alkylene radical and T is p-phenylene, m-phenylene, naphthalene, a divalent cycloaliphatic radical, or a combination comprising at least one of the foregoing. This class of polyester includes the poly(alkylene terephthalates).

The polycarbonate can be based on bisphenol A, in which each of $A^1$ and $A^2$ is p-phenylene and $Y^1$ is isopropylidene. The weight average molecular weight of the polycarbonate can be about 5,000 atomic mass units (amu) to about 100,000 amu, particularly about 10,000 amu to about 65,000 amu, and more particularly about 15,000 amu to about 35,000 amu. It is further noted that the polycarbonate can be present in an amount greater than or equal to 60 wt. %, particularly 60 wt. % to about 90 wt. %, and more particularly about 70 wt. % to about 80 wt. %, wherein weight percents are based on a total weight of the thermoplastic composition.

In various embodiments, it is further noted that the polyimides of formula (I) and the polyetherimides of formula (VIII) can be copolymerized with polysiloxanes, to form polyimide-polysiloxane copolymers. Polysiloxanes have the formula:

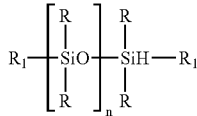

(XIX)

wherein R is the same or different $C_{(1-14)}$ monovalent hydrocarbon radical or $C_{(1-14)}$ monovalent hydrocarbon radical substituted with radicals inert during polycondensation or displacement reactions. The integer n can be about 1 to about 200. The reactive end group $R^1$ can be any functionality capable of reacting with the reactive endgroups on the polyimide of formula (I) or the polyetherimide of formula (VIII). Suitable reactive end groups include, for example, halogen atoms; lower dialkylamino groups of from 2 to about 20 carbon atoms; lower acyl groups of from 2 to about 20 carbon atoms; lower alkoxy of from 2 to about 20 carbon atoms; and hydrogen. U.S. Pat. No. 3,539,657 discloses certain siloxane-polyarylene polyether block copolymers, and describes, in general and specific terms, numerous siloxane oligomers having reactive end groups. More particularly, it is noted that siloxane oligomers can comprise those in which $R^1$ represents a dimethylamino group, an acetyl group or a chlorine atom.

The polyimide-siloxane copolymers can be block or graft copolymers wherein the polyimide oligomer and the siloxane oligomer are employed in substantially equimolar amounts; e.g., the molar ratio of the polyimide oligomer to the siloxane oligomer ranges can be about 0.8:1 to about 1.2:1, or, more specifically from about 0.9:1 to about 1.1:1. The polyimide-siloxane copolymer can be present in amount of about 1 wt. % to about 20 wt. %, particularly about 1 wt. % to about 10 wt. %, and more particularly about 1 wt. % to about 5 wt. %, wherein weight percents are based on a total weight of the thermoplastic composition.

As noted above, the thermoplastic composition can optionally comprise various additives. For example, the composition can optionally comprise a colorant. More particularly, the colorant can comprise a colorant that has good thermal stability under the melt processing conditions used to process the thermoplastic composition. Suitable colorants include, but are not limited to, titanium dioxide, zinc sulfide, zinc oxide, barium sulfate, carbon black, iron oxides, cobalt aluminates, chrome oxides, nickel titanates, molybdenum oxides, chrome copper oxides, ultramarine blue, phthalocyanines, quinacridones, perylenes, isoindolinones, and combinations comprising at least one of the foregoing. Other colorants such as pigment white 6, pigment black 7, pigment blue 29, pigment blue 28, pigment blue 36, pigment brown 33, pigment brown 24, solvent green 3, solvent green 28, pigment green 50, pigment blue 36, solvent orange 60, pigment orange 75, pigment red 101, pigment red 52, solvent red 52, solvent red 151, solvent violet 13, solvent violet 36, solvent yellow 33, pigment yellow 53, solvent red 179, solvent orange 63, solvent yellow 98, pigment red 179, pigment red 202, solvent red 236, solvent yellow 188, pigment blue 15:4, pigment green 7 and combinations comprising at least one of the foregoing can be used in addition to or in place of the preceding colorants.

The thermoplastic composition can optionally include effective amounts of at least one additive to impart the desired properties of the additive. Additives include, but not limited to, anti-oxidants, drip retardants (e.g., polytetrafluoroethylene, and the like), visual effects additives, stabilizers, antistatic agents, plasticizers, lubricants, mold release agents, and the like, and combinations comprising at least one of the foregoing. Effective amounts of the additives can vary widely, but generally can be present in an amount of less than or equal to about 30 wt. %, based on a total weight of the thermoplastic composition.

In various embodiments, it is advantageously noted that a recycled thermoplastic resin(s) can be employed in making the thermoplastic composition (e.g., recycled polyetherimide, recycled polycarbonate, and the like, as well as combinations comprising at least one of the foregoing). It is to be understood that the recycled thermoplastic resin(s) can include process recycle (e.g., scrap material generated during the manufacturing process) and can also include end user (e.g., consumer) recycle materials. Furthermore, since recycle materials generally cost less than non-recycled materials (e.g., "new" materials), an article made using recycled materials can advantageously cost less than an article produced with new materials.

In an exemplary embodiment, the thermoplastic composition can comprise greater than or equal to 60 wt. % polycarbonate (e.g., Lexan® resins, commercially available from the General Electric Company), particularly 60 wt. % to about 90 wt. %, and more particularly about 70 wt. % to about 80 wt. %; and a sufficient amount of a polyimide resin to impart the desirable flammability, smoke, and toxicity properties to the thermoplastic composition, wherein weight percents are based on a total weight of the thermoplastic composition. For example, the thermoplastic composition can comprise a sufficient amount of a polyimide resin such that an article made with the thermoplastic composition can pass Federal Aviation Regulation (FAR) 25.853 (air worthiness standard for aircraft compartment interiors), which sets the fire protection requirements for a compartment (cabin) interior of an aircraft, and more particularly can meet Appendix F, part I (b)(4) of FAR 25.853. More particularly, the polyimide resin can be polyetherimide (e.g., Ultem® resins, commercially available from General Electric Company), wherein the polyetherimide can be present in an amount of about 10 wt. % to about 40 wt. %, particularly about 15 wt. % to about 30 wt. %, wherein the weight percents are based on a total weight of the thermoplastic composition.

In various other embodiments, the thermoplastic composition can consist essentially of greater than or equal to about 60 wt. % polycarbonate; about 10 wt. % to about 40 wt. % of a polyimide; and wherein weight percents are based on a total weight of the thermoplastic composition. It is to be understood that any component that would not materially effect, for example, the gloss properties of the thermoplastic composition are envisioned to be with the scope of this disclosure. More particularly, an article made of the thermoplastic composition can have a 60 degree gloss measurement measured before thermoforming of less than or equal to about 30, particularly about 4 to about 30, and more particularly about 10 to about 20 as measured at 60 degrees following ASTM D523. The gloss measured after thermoforming can be less than or equal to about 25 as measured at 60 degrees following ASTM D523.

In making the thermoplastic composition, the thermoplastic composition can be formed by any suitable method for forming an intimate blend. Some or all of the components can be dry blended first and then combined under conditions sufficient to melt at least one of the resin components of the thermoplastic composition. The thermoplastic composition can then be pelletized or formed into an article.

While it is noted that any suitable method of forming an article employing the thermoplastic composition can be employed (e.g., thermoforming, profile extrusion, blow molding, injection molding, and the like), in a particular embodiment, the thermoplastic composition can advantageously be formed by thermoforming, which can reduce the overall cost in manufacturing the article. It is generally noted that the term "thermoforming" is used to describe a method that can comprise the sequential or simultaneous heating and forming of a material onto a mold, wherein the material is originally in the form of a film (e.g., sheet, layer, and the like) and is formed into a desired shape. Once the desired shape has been obtained, the formed article (e.g., a component of a vehicular interior such as wall panels, overhead storage lockers, serving trays, seat backs, cabin partitions, window covers, and the like) is cooled below its glass transition temperature. For example, suitable thermoforming methods can include, but are not limited to, mechanical forming (e.g., matched tool forming), membrane assisted pressure/vacuum forming, membrane assisted pressure/vacuum forming with a plug assist, and the like.

Additionally, with regards to the film employed in the thermoforming methods, it is briefly noted that the film can be a single or a multi-layer film. In those embodiments where a multi-layer film is employed, it is noted that a core layer (inner layer) can comprise the same or different materials than a cap layer (outer layer(s)). Generally, a cap layer(s) can optionally be employed for aesthetic purposes, and the like. The film (single or multi-layer) can be made by any suitable method. For example, the core layer and the cap layer can be co-extruded to form a dual layer film, which can optionally then be rolled (stored) to be subsequently processed (e.g., laminated with optional layers). Alternatively, the dual layer film can be fed directly to a lamination area where any optional layers can be laminated onto the dual layer film. In other embodiments, an extrusion-lamination method can be employed wherein the co-extruded cap layer and core layer, for example, can be laminated with optional layer(s) while the core layer and the cap layer are in a softened state. In yet another embodiment, the core layer, cap layer, and any other layer(s) can all be co-extruded to form a multi-layer film. It is briefly noted with regards to co-extrusion of the multi-layers that a single manifold die or a multi-manifold die can be employed depending on the given properties (e.g., glass transition temperature ($T_g$)) for each thermoplastic composition employed in each layer, or viscosity at processing temperature).

For example in operation, a molten thermoplastic composition(s) (e.g., a thermoplastic composition that has been heated to a temperature greater than a glass transition temperature ($T_g$) of the thermoplastic composition) can be extruded from a slot die. The molten thermoplastic composition can then be passed through a nip (e.g., a space formed between two calendering rolls), which when cooled can form the dual layered film. Having passed the molten thermoplastic composition through the nip, the thermoplastic composition can be cooled (e.g., to a temperature less than the $T_g$ of the thermoplastic composition), and can then be passed through pull rolls. As discussed above, the cooled dual layer film can optionally be rolled (stored) to be subsequently processed (e.g., laminated), or the dual layer film can be feed directly to a lamination area.

In various embodiments, the calendering roll(s) can comprise a polished roll (e.g., a chrome or chromium plated roll). In other embodiments, the roll(s) can comprise a textured roll (e.g., a roll comprising an elastomeric material (e.g., an EPDM (ethylene propylene diamine monomer) based rubber)). Suitable materials for the rolls include plastic, metal (e.g., chrome, stainless steel, aluminum, and the like), rubber (e.g., EPDM), ceramic materials, and the like. Furthermore, it is generally noted that the size of the rolls, material of the rolls, number of rolls, the film wrap around the rolls, and the like, can vary with the system employed. Further, it is noted that processing conditions (e.g., the temperature of the calendering rolls, the line speed, nip pressure, and the like) can also be varied.

In an exemplary embodiment, an article can be formed using a multi-layer film, wherein the multi-layer film can comprise the thermoplastic composition disclosed throughout this disclosure as a core layer. Optional cap layer(s) can be disposed in physical communication with the core layer as discussed above. More particularly, the cap layer can be laminated on the core layer. The cap layer can comprise, those resin materials listed above (e.g., polycarbonate, polyetherimide, and the like), polypropylenes, polyethylenes (e.g., high density polyethyelenes, low density polyethylenes, linear low density polyethylenes, and the like), polyvinyl fluorides (PVFs), and the like, as well as combinations comprising at least one of the foregoing. More particularly, in various embodiments, the cap layer can comprise PVF, which can be particularly useful for aesthetic purposes.

Additionally, it is noted that the article (particularly at least the core layer of a multi-layer film employed in making the article) can be made using recycled thermoplastic resins, which generally cost less than "new" materials, thereby lowering the overall material cost in making the article. For example, the core layer 12 can comprise about 0 wt. % to about 100 wt. % recycled thermoplastic resin, particularly about 75 wt. % to about 90 wt. %, more particularly 90 wt. % to about 100 wt. %, wherein weight percents are based on a total weight of the core layer.

EXAMPLES

Referring now to Table 1, Sample 1 was an example of an exemplary thermoplastic resin taught herein, wherein the thermoplastic resin was particularly useful for making vehicle interior components. Samples 2-3 were provided for comparative purposes. More particularly, Samples 2-3 were examples of a commercially available thermoplastic comprising polyetherimide (e.g. Ultem® resins, commercially available from General Electric Company) and polycarbonate.

TABLE 1

| Component | Sample 1 | Sample 2 (Comparative) | Sample 3 (Comparative) |
|---|---|---|---|
| Polyetherimide | 19.00 | 71.90 | 68.10 |
| Polycarbonate | 74.35 | 19.00 | 18.00 |
| Heat Stabilizer (Irgafos 168) | 0.10 | 0.10 | 0.10 |
| Mold release (Pentaerythritol tetrastearate) | 0.30 | 0 | 0 |
| Antidrip (PTFE) | 0.25 | 0 | 0 |
| Titanium Dioxide | 5.00 | 5.00 | 5.00 |
| PEI-Si Copolymer | 1.00 | 4.00 | 3.80 |
| Talc (hydrous magnesium silicate) | 0 | 0 | 5.00 |
| 60 deg Gloss | | | |
| Before thermoforming | 4-10 | 10-15 | 8-12 |
| After thermoforming | 15-20 | 60-80 | 30-45 |
| Thermal properties | | | |
| HDT (° C.) | 136 | 180 | 178 |
| Impact Properties | | | |
| Notched Izod (ft-lb/in) | 4.80 | 1.40 | 1.36 |
| Weathering | | | |
| Color delta E | 0.28 | 1.0 | |

Samples 1-3 were extruded into sheets and thermoformed into an article. Gloss measurements at 60 degrees, following ASTM D523, were taken for both the extruded sheet and the thermoformed article. Notched Izod impact testing was carried out according to ASTM D256. The heat deflection temperature (HDT) was measured according to ASTM D648, using a pressure of 264 pounds per square inch (psi). The HDT results were in degrees Celsius (° C.).

Samples 1 and 2 were also weather tested. More particularly, weathering was tested per ASTM G155, wherein the weathering was in fact performed behind a 0.118 inch glass with 30% light transmission that is typical of the glass employed in passenger rail transportation vehicles. The color delta E measurement (measured after 500 hours weathering as per ASTM G155) was measured using a Gretag-Macbeth Color-Eye 7000A spectrometer per ASTM D2244. It was noted that sample 1 had a color delta E measurement less than 0.5.

Without being bound by theory, by increasing the ratio of polycarbonate to polyetherimide (Sample 1) compared to Samples 2-3 a thermoplastic composition can be obtained having chemical resistance similar to that of Samples 2-3, but with surprisingly lower gloss values. It is generally noted that polycarbonate in itself tends to exhibit a higher gloss compared to polyetherimide. As such, it is unexpected that by increasing the ratio of polycarbonate to polyetherimide that gloss values would decrease. It is further noted that Sample 1 had lower gloss values before and after thermoforming than the other samples. These gloss values were obtained without the use of additives, e.g., talc, which has traditionally been employed to lower the gloss of a thermoplastic composition.

Referring to Table 2, additional exemplary formulations (Samples 4-7) were illustrated. More particularly, the flame spread and smoke development for each sample was tested per ASTM E162 and per ASTM E662 respectively.

TABLE 2

| Component | Sample 4 | Sample 5 | Sample 6 | Sample 7 |
|---|---|---|---|---|
| Polyetherimide | 20.00 | 20.00 | 20.00 | 20.00 |
| Polycarbonate | 73.80 | 65.90 | 67.30 | 65.30 |
| Heat Stabilizer (Irgafos 168) | 0.10 | 0.10 | 0.10 | 0.10 |
| Mold release (Pentaerythritol tetrastearate) | 0.30 | 0 | 0.30 | 0.30 |
| Antidrip (PTFE) | 0.30 | 0 | 0.30 | 0.30 |
| Titanium Dioxide | 3.00 | 5.00 | 5.00 | 5.00 |
| PEI-Si Copolymer | 0 | 4.00 | 2.00 | 4.00 |
| Talc (hydrous magnesium silicate) | 2.50 | 5.00 | 5.00 | 5.00 |
| Flame Spread | Flaming Drips | Flaming Drips | Pass | Pass |
| Smoke Development | Pass | Pass | Pass | Pass |

Without being bound by theory, it was noted that although polyetherimide can impart flame retardant properties to a given formulation, at the weight percents disclosed herein, samples 6 and 7 showed that an anti-drip agent (e.g., PTFE) in combination with a polyetherimide-silicon containing copolymer can be employed in order to pass the flame spread test of ASTM E162 and/or the smoke development test of ASTM E662.

Advantageously, the thermoplastic composition disclosed herein generally can cost less than traditional polyetherimide compositions, since the thermoplastic composition is rich in polycarbonate (e.g., greater than or equal to about 60 wt. %). It is noted that polycarbonate is less expensive compared to polyetherimide. Employing recycled resins as discussed above, and a thermoforming process of forming the article can further reduce the cost of the article made with the thermoplastic.

The thermoplastic compositions disclosed herein also exhibit unexpected physical properties that can be particularly useful for articles used in vehicle interiors. More particularly, the thermoplastic composition disclosed herein can allow articles to be made that can have a gloss before thermoforming of less than or equal to about 30, particularly about 4 to about 30, and more particularly about 10 to about 20 as measured at 60 degrees following ASTM D523. The gloss after thermoforming can be less than or equal to about 25 as measured at 60 degrees following ASTM D523. Further, the thermoplastic composition disclosed herein can pass fire protection requirements set forth by the Federal Aviation Administration (FAA) and other requirements set forth by the Federal Railroad Administration (FRA). More particularly, the thermoplastic composition can pass Federal Aviation Regulation (FAR) 25.853 (air worthiness standard for aircraft compartment interiors), which sets the fire protection requirements for a compartment (cabin) interior of an aircraft, and more particularly can meet Appendix F, part I (b)(4) of FAR 25.853. Additionally, it is noted that the thermoplastic composition disclosed herein can be compliant with FRA, 49 CFR 223 (safety glazing standards-locomotives, passenger cars and cabooses).

While the invention has been described with reference to several embodiments thereof, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A thermoplastic composition comprising:
    greater than or equal to about 60 wt. % of a polycarbonate homopolymer comprising units derived from 2,2-bis(4-hydroxyphenyl)propane;
    about 10 wt. % to about 40 wt. % of a polyimide that does not contain siloxane units;
    about 1 wt. % to about 20 wt. % of a polyimide-siloxane copolymer; and
    an anti-drip agent;
    wherein weight percents are based on a total weight of the thermoplastic composition, and further wherein a sample of the composition passes ASTM E162.

2. The thermoplastic composition of claim 1, wherein the polyimide is polyetherimide.

3. The thermoplastic composition of claim 2, wherein the polycarbonate is present in an amount of about 60 wt. % to about 90 wt. %.

4. The thermoplastic composition of claim 2, wherein the polycarbonate is present in an amount of about 70 wt. % to about 80 wt. %, and wherein the polyetherimide is present in an amount of about 15 wt. % to about 30 wt. %.

5. The thermoplastic composition of claim 1, wherein the thermoplastic composition has a 60 degree gloss measurement of less than or equal to about 30 as measured by ASTM D523.

6. The thermoplastic composition of claim 5, wherein the 60 degree gloss measurement is about 4 to about 30.

7. The thermoplastic composition of claim 6, wherein the 60 degree gloss measurement is about 10 to about 20.

8. The thermoplastic composition of claim 1, further comprising about 1 wt. % to about 10 wt. % of the polyimide-polysiloxane copolymer.

9. The thermoplastic composition of claim 1, wherein each of the polycarbonate and the polyimide are recycled resins, wherein the recycled resins are present in an amount of about 75 wt. % to about 90 wt. %, wherein weight percents are based on a total weight of the thermoplastic composition.

10. An article comprising:
    a thermoplastic composition comprising greater than or equal to about 60 wt. % of a polycarbonate homopolymer comprising units derived from 2,2-bis(4-hydroxyphenyl) propane; about 10 wt. % to about 40 wt. % of a polyimide that does not contain siloxane units: about 1 wt. % to about 20 wt. % of a polymide-siloxane copolymer; and an anti-drip agent, wherein weight percents are based on a total weight of the thermoplastic composition, and further wherein a sample of the composition passes ASTM E162.

11. The article of claim 10, wherein the article comprises multiple layers.

12. The article of claim 10, wherein the polyimide is polyetherimide.

13. The article of claim 12, wherein the polycarbonate is present in an amount of about 60 wt. % to about 90 wt. %.

14. The article of claim 12, wherein the polycarbonate is present in an amount of about 70 wt. % to about 80 wt. %, and wherein the polyetherimide is present in an amount of about 15 wt. % to about 30 wt. %.

15. The article of claim 10, wherein the thermoplastic composition has a 60 degree gloss measurement of less than or equal to about 30 as measured by ASTM D523.

16. The article of claim 10, wherein the 60 degree gloss measurement is about 4 to about 30.

17. The article of claim 10, wherein the 60 degree gloss measurement is about 10 to about 20.

18. The article of claim 10, wherein each of the polycarbonate and the polyimide are recycled resins, and wherein the recycled resins are present in an amount of about 75 wt. % to about 90 wt. %, wherein weight percents are based on a total weight of the thermoplastic composition.

19. The article of claim 10, wherein the thermoplastic composition has a color delta F measurement as measured per ASTM D224 after 500 hours weathering per ASTM G155.

20. A method of making an article comprising:
    forming a film comprising greater than or equal to about 60 wt. % of a polycarbonate homopolymer comprising units derived from 2,2-bis(4-hydroxyphenyl) propane; about 10 wt. % to about 40 wt. % of a polyimide that does not contain siloxane units; about 1 wt. % to about 20 wt. % of a polymide-siloxane copolymer; and an anti-drip agent, wherein weight percents are based on a total weight of the thermoplastic composition, and further wherein a sample of the composition passes ASTM E162; and
    thermoforming the film to form the article.

21. The method of claim 20, wherein the polycarbonate is present in an amount of about 70 wt. % to about 80 wt. %, and wherein the polyetherimide is present in an amount of about 20 wt. % to about 30 wt. %.

22. The method of claim 20, wherein after thermoforming the article comprises a 60 degree gloss measurement of less than or equal to about 25 as measured at 60 degrees following ASTM D523.

23. A method of making an article comprising:
    co-extruding a core layer and cap layer to form a multi-layer film, wherein the core layer comprises greater than or equal to about 60 wt. % of a polycarbonate homopolymer comprising units derived from 2,2-bis (4-hydroxyphenyl) propane, about 10 wt. % to about 40 wt. % of a polyimide that does not contain siloxane units, about 1 wt. % to about 20 wt. % of a polyimide-siloxane copolymer, and an anti-drip agent, wherein weight percents are based on a total weight of the core layer, and further wherein a sample of the composition passes ASTM E162; and thermoforming the multi-layer film to form the article.

24. The method of claim 22, wherein the core layer and the cap layer are co-extruded in a single manifold.

25. The method of claim 22, wherein each of the polycarbonate and the polyimide are recycled resins, and wherein the recycled resins are present in an amount of about 75 wt. % to about 90 wt. % wherein weight percents are based on a total weight of the thermoplastic composition.

26. The method of claim 22, further comprising texturing a surface of the multi-layer film.

27. A thermoplastic composition comprising
reaction products of greater than or equal to about 60 wt. % of a polycarbonate homopolymer comprising units derived from 2,2-bis(4-hydroxyphenyl) propane; about 10 wt. % to about 40 wt. % of a polyimide; about 1 wt. % to about 20 wt. % of a polyimide-siloxane copolymer; and an anti-drip agent; and wherein weight percents are based on a total weight of the thermoplastic composition; and further wherein a sample of the composition passes ASTM E162.

28. A thermoplastic composition consisting essentially of:
greater than or equal to about 60 wt. % of a polycarbonate homopolymer comprising units derived from 2,2-bis (4-hydroxyphenyl) propane;
about 10 wt. % to about 40 wt. % of a polyimide that does not contain siloxane units;
about 1 wt. % to about 20 wt. % of a polyimide-siloxane copolymer; and
an anti-drip agent;
wherein weight percents are based on a total weight of the thermoplastic composition: and further wherein a sample of the composition passes ASTM E162.

29. A thermoplastic composition consisting essentially of:
reaction products of greater than or equal to about 60 wt. % of a polycarbonate homopolymer comprising units derived from 2,2-bis(4-hydroxyphenyl) propane; about 10 wt. % to about 40 wt. % of a polyimide that does not contain siloxane units; about 1 wt. % to about 20 wt. % of a polyimide-siloxane copolymer; and an anti-drip agent; and wherein weight percents are based on a total weight of the thermoplastic composition; and further wherein a sample of the composition passes ASTM E162.

* * * * *